INVENTORS.
Dudley D. Nye, Jr.
Frederick L. Maltby
BY
ATTORNEY

United States Patent Office 2,885,576
Patented May 5, 1959

2,885,576

SCANNING CONTROL SYSTEM

Dudley D. Nye, Jr., Jenkintown, and Frederick L. Maltby, Abington, Pa., assignors to Robertshaw-Fulton Controls Company, Richmond, Va., a corporation of Delaware Application November 25, 1957, Serial No. 698,479

14 Claims. (Cl. 307—149)

This invention relates to feedback control systems, and more particularly to electronic circuitry and components for sampling a plurality of variables and developing correctional signals related thereto.

In certain industrial processes, it is necessary to monitor and correct the amount by which many variables deviate from individual predetermined datum levels. Such monitoring may be readily accomplished by individual servomechanism units which continually compare a quantity such as temperature, pressure, or incident radiant energy to some preset standard and derive an electrical error signal related to the deviations therefrom. The correctional signals which are relied upon to eliminate such deviations may take any one of a number of forms. For instance, the level of such signals may vary in direct proportion to the magnitude of the deviations or, the signal may vary in proportion to either the time-derivative or the time integral of the deviation. Under some circumstances, it is desirable to employ correctional signals which combine proportional action with either derivative or integral action. In still other systems, it is useful to employ proportional corrective action combined with both integral and derivative action. The present invention contemplates a system which periodically scans the individual error signals produced in sampling a plurality of variables and produces correctional signals of the proper type responsive thereto.

Accordingly, therefore, a primary object of this invention is to sample periodically each of a group of error signals and generate individual proportional, integral, or time derivative signals, or combinations thereof, in response thereto.

Another object of this invention is to utilize an automatic zeroing circuit as one of the contacts in a multi-contact scanning control system.

A further object of this invention is to utilize various types of computing impedances to accomplish combinations of proportional, derivative, and integral control.

A further object of this invention is to eliminate extraneous signals caused by the pick-up of power system frequencies.

These and other objects and advantages will become apparent by referring to the following detailed description and drawings, in which like numerals indicate like elements and in which.

Figure 1:
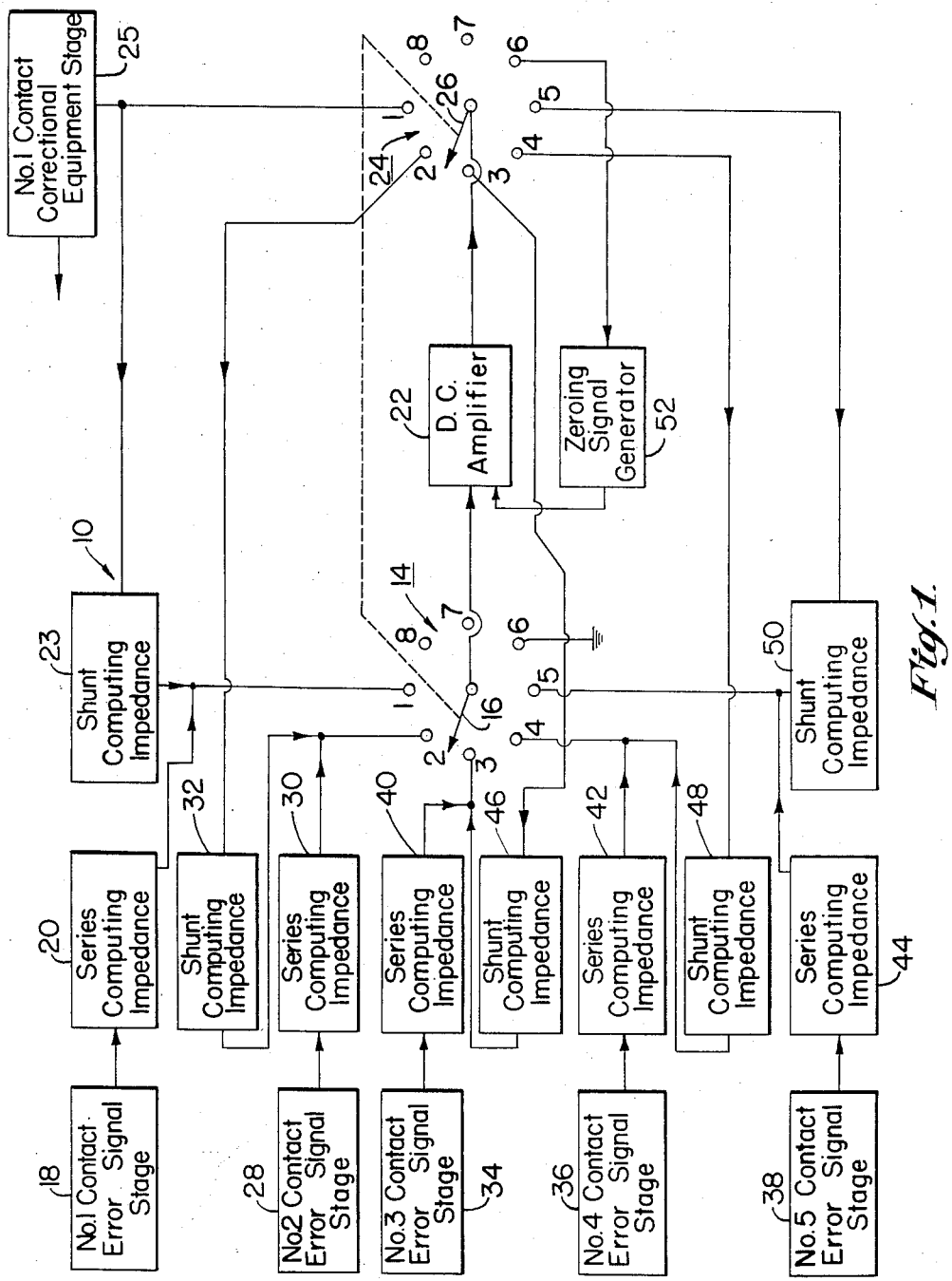
Fig. 1 shows diagrammatically the circuitry and interconnections used for scanning error signals related to each of a plurality of individual variables.

Turning now to the drawings and more particularly to Fig. 1 thereof, the numeral 10 indicates generally the circuitry and components employed in practicing the invention. The system is seen to include a scanning switch 14 provided with a rotatably disposed wiper 16. The wiper 16 is mounted to successively engage the individual contacts provided in a set of eight contacts spaced around the periphery of a circle, and numbered in a counterclockwise direction. The identification of the respective contacts by the reference numerals 1 through 8 is clearly illustrated in the central left hand portion of Fig. 1. In order to nullify and cancel extraneous signals, such as the pick-up of the power frequency which is used to energize various components of the equipment, it is necessary to correlate the speed of the wiper 16 with that of the power frequency. This is accomplished according to the invention by having the wiper 16 engage the contacts and sample the error signals every $N/2$ periods of the power frequency, where N is any odd integer such as 1, 3, 5, 7, 9, etc. Under these circumstances, the average value of any such extraneous signal is zero, and the accuracy of the system is substantially undisturbed thereby.

The No. 1 contact of the scanning switch 14 is connected to receive an electrical potential in the form of an error signal from the No. 1 contact error signal stage 18 indicated in block diagram form in the extreme left side portion of the drawing.

The stage 18 generically comprehends conventional apparatus for detecting variations in any parameter from a preset datum or reference and producing an electrical signal related thereto. Thus, the error signal provided by stage 18 may be generated by a thermocouple, and indicate thermal error above or below a predetermined temperature. Conversely, this error signal may comprise an electrical voltage related to changes in pressure above or below some datum level. It should be appreciated in this connection that the invention is not limited to any specific configuration or circuitry or components for deriving an error signal.

The output signal produced by the error signal stage 18 is applied to one lead of a series computing impedance 20. When the wiper 16 engages the No. 1 contact, the other lead of the computing impedance 20 is conductively interconnected directly to a D.C. amplifier 22. The amplifier 22 may be of conventional construction and it will be understood that the specific details thereof form no part of the present invention.

If desired, the invention may be practiced equally well in conjunction with a chopper-fed A.C. amplifier. Then the wiper 16 is interconnected to a conventional vibratory type chopper which commutates the error signal into an alternating type voltage. The alternating signal thus developed is transformer coupled into a conventional A.C. type amplifier which provides an output suitable for direct connection to wiper 26 of the right hand scanning switch. The use of such a chopper in conjunction with an A.C. amplifier eliminates the need for both the D.C. amplifier and the zeroing circuitry shown therebeneath. It is necessary to energize the vibratory chopper as well as the scanning switch in synchronism with the pick up frequency if only a few cycles of A.C. are produced by the chopper at each point of switch 14.

The No. 1 contact of switch 14 is also connected to a shunt computing impedance 23. To the right of Fig. 1, there is illustrated a second scanning switch 24 provided with a rotatably disposed wiper 26. The wiper 26 is ganged to the wiper 16 of the earlier mentioned scanning switch, and rotates synchronously therewith. The specific type of ganging employed may be of the conventional mechanical and electronic type, and does not form a part of the present invention. The wiper 26 is mounted to successively engage the individual contacts provided with a set of eight contacts which are spaced around the periphery of a circle, and numbered in a counterclockwise direction. The identification of the responsive contacts by means of the reference numerals 1 through 8 is believed clear from an inspection of the drawing.

The output signal developed by the D.C. amplifier 22 is conductively connected to the wiper 26. It will now be appreciated that when the rotatable wiper 16 in the left hand scanning switch engages a contact such as the No. 1 contact, the output of the error signal stage 18 is coupled, via series computing impedance 20, directly into the D.C. amplifier 22. However, by virtue of the synchronous rotation of wiper 26 in the left hand scanning switch, the signal from the amplifier is delivered to the No. 1 contact of the right hand scanning switch. Simultaneously, the shunt computing impedance 23 is connected between output and input of amplifier 22. When the negative gain of amplifier 23 is very large, its output is determined entirely by the computing impedances and the error signal. The composite signal thus made available at the No. 1 contact of the right hand scanning switch is employed in eliminating the error signal detected by the stage 18 shown in the right hand portion. This elimination of the error signal is accomplished by the No. 1 contact correctional equipment stage 25 shown diagrammatically above the right hand scanning switch. The stage 25 will be understood to generically comprehend apparatus for regulating a temperature, a pressure, the physical position of an object, or the like. Although only one such correctional equipment stage is shown, to avoid complicating the drawing, it will be understood that the other contacts of the right hand scanning switch are likewise connected to similar correctional equipment stages which act to eliminate the error signals generated by the respective error signal stages shown in the left hand portion of the drawing.

By proper selection and proportioning of the series and shunt computing impedances, any desired form of correctional signal may be derived. For instance, where resistance elements are used for the shunt and series impedances in order to obtain proportional control, and the actual amplifier gain substantially exceeds unity, the proportional gain is approximately equal to the ratio of such resistances. The various additional forms of computing impedances employed in practicing the invention are discussed in detail hereinafter.

Returning now to Fig. 1, it will be observed that the No. 2 contact of the left hand scanning switch receives the output at the No. 2 contact error signal stage 28 through a series computing impedance 30. This output is simultaneously applied to a shunt computing impedance 32 shown immediately thereabove.

In like manner, the third, fourth, and fifth contacts are connected, respectively, to receive signals from error signal stages 34, 36, and 38 via the series computing impedances 40, 42, and 44. The potentials available at the third, fourth, and fifth contacts are simultaneously made available to the shunt computing impedances 46, 48, and 50, respectively.

It will be observed in Fig. 1 that one lead of each of the shunt impedances 23, 32, 46, 48, and 50 is associated with the first, second, third, fourth, and fifth contacts of the left hand scanning switch, respectively. The other lead of each of these impedances is conductively connected directly to the first, second, third, fourth, and fifth contacts of the right hand scanning switch respectively. Although error signal stages and computing impedances are shown for only five of the contacts of the scanning switch 14, in order to avoid complicating the drawing, it will be appreciated that any number of contacts on the switch may be employed equally well in practicing the invention.

In Fig. 1, means are illustrated for automatically zeroing the system once during each revolution of the synchronized wipers 16 and 26. This is accomplished by providing a ground connection to one of the contacts, such as the No. 6 contact in the left hand scanning switch. The corresponding contact in the right hand scanning switch is connected to the input of the zeroing signal generator 52 illustrated directly beneath the D.C. amplifier 22. The output of the signal generator 52 is coupled to an input of the D.C. amplifier and automatically provides a signal to cause the amplifier output to be zero when switches 14 and 24 are at position 6.

Figure 2:
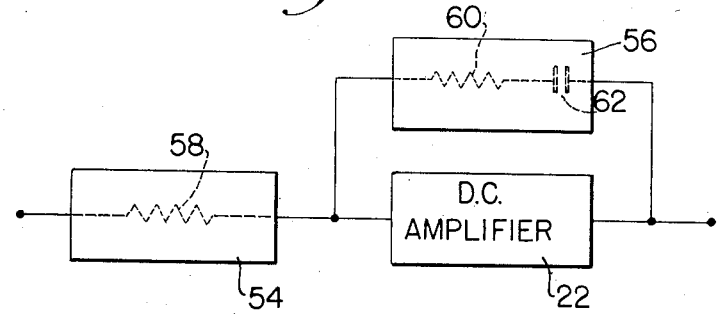
Fig. 2 illustrates one embodiment of series and shunt computing impedances used to produce a correctional signal.

Turning to the description of the series and shunt computing impedances, reference to Fig. 2 will now be made. In Fig. 2, the reference numerals 54 and 56 have been used to designate generally series and shunt computing impedances which provide a correctional signal proportional to changes in the magnitude of the error signal with time, as well as to the integral thereof. More particularly, the series impedance 52 is seen to comprise a resistor 58, and the shunt impedance is seen to include a resistor 60 connected in series with a capacitor 62. In this circuit, the integral action, or reset action, as it is often referred to, is controlled by the resistor 58 and capacitor 62. When a high gain amplifier is used, the reset time is given by the product of resistor 58 times capacitor 62. The proportioning gain is the ratio of resistance of resistor 60 to resistance of resistor 58.

Figure 3:
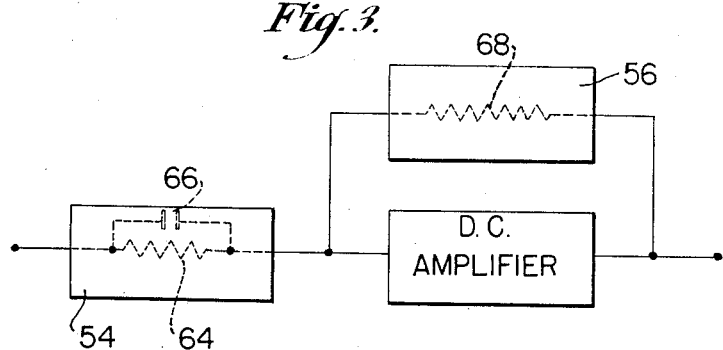
Fig. 3 illustrates another embodiment of series and shunt computing impedances used to produce a correctional signal.

In Fig. 3, the circuitry for providing both proportional and derivative corrective action is illustrated. In this system, the series computing impedance comprises a resistor 64 and a capacitor 66 connected in parallel. The shunt computing impedance comprises a resistor 68. In this circuit, the proportional gain is given by the ratio of resistor 68 to resistor 64. The derivative time is set by the product of resistor 64 multiplied by capacitor 66.

Figure 4:
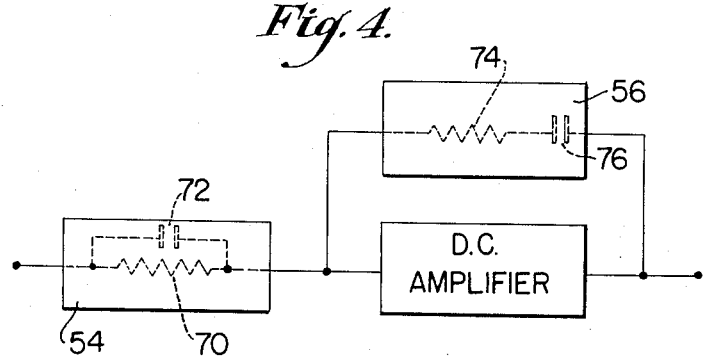
Fig. 4 illustrates a still further embodiment of series and shunt computing impedances used to produce a correctional signal.

In Fig. 4, the circuitry for providing both derivative and integral corrective action along with proportional action is illustrated. The series computing impedance 54 includes a parallel connected resistor 70 and capacitor 72. The shunt computing impedance comprises the resistor 74 connected in series with a capacitor 76. For equality between capacitors 72 and 76, the reset rate is controlled by the ohmic value of resistor 74, and the derivative time is controlled by the ohmic value of resistor 70.

Ordinarily the capacitors employed in the various computing impedances discussed in conjunction with Figs. 2, 3, and 4 are characterized by charge and discharge time constants substantially greater than the period of the scanning switch. Thus, the intermittently connected D.C. amplifier of Fig. 1 is permitted to approach the characteristics of a continuously connected amplifier. Smoothing and clamping circuits may also be used to permit lower scanning rates.

While only one embodiment of the invention has been shown and described herein, it will be apparent to those skilled in the art that the construction and arrangement of parts in the present invention may be variously embodied or changed without departing from the scope of the invention as defined in the appended claims.

We claim:

1. In a scanning control system, amplifier means, means including a first multicontact switch provided with a rotatable wiper conductively connected to the input of said amplifier means, a plurality of error signal stages; a plurality of series computing impedances interconnected between said signal stages and said contacts of said switch, respectively; means including a second multicontact switch provided with a rotatable wiper conductively connected to the output of said amplifier means, and means including a plurality of individual shunt computing impedance means connected between corresponding contacts on said first and second multicontact switches.

2. In a scanning control system, a first scanning switch provided with a plurality of contacts and a wiper mounted to engage said contacts, at least one series computing impedance connected to a sample an electrical error signal and apply a potential to one of said contacts responsive thereto, an amplifier connected to receive an input signal via said wiper, a second scanning switch provided with a plurality of contacts and a wiper mounted to receive an output signal from said amplifier and engage said contacts, and at least one shunt computing impedance interconected between said series computing impedance and a contact on said second switch.

3. In a scanning control system, a first scanning switch provided with a plurality of contacts and a wiper mounted to engage said contacts, at least one series computing impedance connected to sample an electrical error signal and apply a potential to one of said contacts responsive thereto, an amplifier connected to receive an input signal via said wiper, a second scanning switch provided with a plurality of contacts and a wiper mounted to receive an output signal from said amplifier and engage said contacts, at least one shunt computing impedance interconnected between said series computing impedance and one contact on said second switch, and means including a zeroing signal generator interconnected between one of said contacts on said second switch and an input of said amplifier.

4. In a scanning control system connected to successively sample the output signals developed by a plurality of error signal stages, first switch means, at least one computing impedance interconnected between one of said error signal stages and a fixed contact of said first switch means, second switch means, amplifier means interconnected between the movable members of said first and second switch means, and a computing impedance interconnected between said fixed contact of said first switch means and a corresponding contact of said second switch means.

5. In a scanning control system connected to successively sample the output signals developed by a plurality of error signal stages, first switch means, at least one computing impedance interconnected between one of said error signal stages and a fixed contact of said first switch means, second switch means, amplifier means interconnected between the movable members of said first and second switch means, and a computing impedance interconnected between said fixed contact of said first switch means and a corresponding contact of said second switch means, said first mentioned computing impedance comprising a resistor, and said second mentioned computing impedance comprising a series connected resistor and capacitor.

6. In a scanning control system connected to successively sample the output signals developed by a plurality of error signal stages, first switch means, at least one computing impedance interconnected between one of said error signal stages and a fixed contact of said first switch means, second switch means, amplifier means interconnected between the movable members of said first and second switch means, and a computing impedance interconnected between said fixed contact of said first switch means and a corresponding contact of said second switch means, said first mentioned computing impedance comprising a parallel connected resistor and capacitor, and said second mentioned computing impedance comprising a resistor.

7. In a scanning control system connected to successively sample the output signals developed by a plurality of error signal stages, first switch means, at least one computing impedance interconnected between one of said error signal stages and a fixed contact of said first switch means, second switch means, amplifier means interconnected between the movable members of said first and second switch means, and a computing impedance interconnected between said fixed contact of said first switch means and a corresponding contact of said second switch means, said first mentioned computing impedance comprising a parallel connected resistor and capacitor and said second mentioned computing impedance comprising a series connected resistor and capacitor.

8. In a scanning control system, power supply means connected to receive alternating electric energy characterized by a predetermined pick-up frequency and derive unidirectional operating potential for said control system therefrom, amplifier means; means including a first multicontact switch provided with a rotatable wiper conductively connected to the input of said amplifier means, said wiper mounted to successively engage the contacts of said switch every $N/2$ periods of said pick-up frequency where N is an odd integer; a plurality of error signal stages; a plurality of series computing impedances interconnected between said signal stages and said contacts of said switch, respectively; means including a second multicontact switch provided with a rotatable wiper conductively connected to the output of said amplifier means; and means including a plurality of individual shunt computing impedance means connected between corresponding contacts on said first and second multicontact switches.

9. In a scanning control system, power supply means connected to receive alternating electric energy characterized by a pick-up frequency and derive unidirectional operating potential for said control system therefrom, amplifier means; means including a first multicontact switch provided with a rotatable wiper conductively connected to the input of said amplifier means, said wiper mounted to successively engage the contacts of said switch every $N/2$ periods of said pick-up frequency where N is an odd integer; a plurality of error signal stages; means mounted to interconnect said signal stages and said contacts of said switch, respectively; means including a second multicontact switch provided with a rotatable wiper conductively connected to the output of said amplifier means; and means mounted to interconnect corresponding contacts on said first and second multicontact switches, respectively.

10. In a scanning control system, the combination comprising a plurality of error signal stages respectively corresponding to a plurality of variables to be monitored and controlled, each of said error signal stages being arranged to produce error signals corresponding to deviation in the corresponding one of the plurality of variables, means for modifying the error signals produced by said plurality of error signal stages, a plurality of impedance elements respectively corresponding to said error signal stages, each of said impedance elements being arranged to alter the manner in which said means modifies the error signals produced by the corresponding one of said error signal stages, and means sequentially connecting said modifying means to each of said error signal stages and the corresponding one of said impedance elements.

11. In a scanning control system, the combination comprising a plurality of error signal stages respectively corresponding to a plurality of variables to be monitored and controlled, each of said error signal stages being arranged to produce error signals corresponding to deviations in the corresponding one of the plurality of variables, means for modifying the error signals produced by said plurality of error signal stages, a plurality of impedance elements respectively corresponding to said error signal stages and being arranged to alter the manner in which said means modifies the error signals produced by the corresponding one of said error signal stages, at least one of said plurality of impedance elements being arranged to cause said means to modify the error signal produced by the corresponding one of said error signal stages in proportion to the integral thereof, and means sequentially connecting said modifying means to each of said error signal stages and the corresponding one of said impedance elements.

12. In a scanning control system, the combination comprising a plurality of error signal stages respectively corresponding to a plurality of variables to be monitored and controlled, each of said error signal stages being arranged to produce error signals corresponding to deviations in the corresponding one of the plurality of variables, amplifying means for modifying the error signals produced by said plurality of error signal stages, a plurality of impedance elements respectively corresponding to said error signal stages and being arranged to alter the manner in which said amplifying means modifies the error signals produced by the corresponding one of said error signal stages, at least one of said plurality of impedance elements being arranged to cause said means to modify the error signal produced by the corresponding one of said error signal stages in proportion to the derivative thereof, and means sequentially connecting said amplifying means to each of said error signal stages and the corresponding one of said impedance elements.

13. In a scanning control system, the combination comprising a plurality of error signal stages respectively corresponding to a plurality of variables to be monitored and controlled, each of said error signal stages being arranged to produce error signals corresponding to deviations in the corresponding one of the plurality of variables, amplifying means for modifying the error signals produced by said plurality of error signal stages, a plurality of impedance elements respectively corresponding to said error signal stages and being arranged to alter the manner in which said amplifying means modifies the error signals produced by the corresponding one of said error signal stages, at least one of said plurality of impedance elements being arranged to cause said means to modify the error signal produced by the corresponding one of said error signal stages in proportion to the magnitude thereof, and means sequentially connecting said amplifying means to each of said error signal stages and the corresponding one of said impedance elements.

14. In a scanning control system, the combination comprising a plurality of error signal stages respectively corresponding to a plurality of variables to be monitored and controlled, each of said error signal stages being arranged to produce error signals corresponding to deviations in the corresponding one of the plurality of variables, amplifying means for modifying the error signals produced by said plurality of error signal stages, a plurality of impedance elements respectively corresponding to said error signal stages and being arranged to alter the manner in which said amplifying means modifies the error signals produced by the corresponding one of said error signal stages, at least one of said plurality of impedance elements being arranged to cause said means to modify the error signal produced by the corresponding one of said error signal stages in proportion to the integral and derivative thereof, and means sequentially connecting said modifying means to each of said error signal stages and the corresponding one of said impedance elements.

No references cited.